United States Patent
Shukla et al.

(10) Patent No.: US 10,089,109 B2
(45) Date of Patent: Oct. 2, 2018

(54) SYSTEM AND METHOD FOR EVALUATING HUMAN RESOURCES IN A SOFTWARE DEVELOPMENT ENVIRONMENT

(71) Applicant: HCL Technologies Limited, Uttar Pradesh (IN)

(72) Inventors: Ashutosh Shukla, Andhra Pradesh (IN); Satya Sai Prakash Kanakadandi, Andhra Pradesh (IN); S U M Prasad Dhanyamraju, Andhra Pradesh (IN)

(73) Assignee: HCL Technologies Limited, Noida, Uttar Pradesh ( * ) Notice: Subject to any disclaimer, the term of this patent is extended or adjusted under 35 U.S.C. 154(b) by 0 days.

(21) Appl. No.: 15/241,680

(22) Filed: Aug. 19, 2016

(65) Prior Publication Data

US 2017/0060578 A1 Mar. 2, 2017

(30) Foreign Application Priority Data

Sep. 1, 2015 (IN) .......................... 2745/DEL/2015

(51) Int. Cl.
*G06F 9/44* (2018.01)
*G06F 8/77* (2018.01)
(Continued)

(52) U.S. Cl.
CPC .......... *G06F 8/77* (2013.01); *G06F 17/30598* (2013.01); *G06Q 10/06398* (2013.01)

(58) Field of Classification Search
CPC ....................................................... G06F 8/77
(Continued)

(56) References Cited

U.S. PATENT DOCUMENTS 6,751,650 B1 * 6/2004 Finch, II ............ G06Q 10/1091
                                                                                   702/182
6,754,874 B1 * 6/2004 Richman ................ G06Q 10/10
                                                                                   715/205

(Continued)

FOREIGN PATENT DOCUMENTS

CN           101091173 A     12/2007

OTHER PUBLICATIONS

Woolam et al, "Multi-Concept Document Classification Using a Perceptron-like Algorithm", IEEE, pp. 570-574, 2008.*

(Continued)

*Primary Examiner* — Anil Khatri
(74) *Attorney, Agent, or Firm* — HM Law Group LLP; Vani Moodley, Esq.

(57) ABSTRACT

The present disclosure discloses system and method for evaluating a human resource in a software development environment. At first, historical performance data and profile data associated with a plurality of human resources involved in a software project is received. From such data (historical performance data and profile data), a plurality of attributes is extracted. Further, Bayesian classification technique is implemented on the plurality of attributes in order to classify the plurality of attributes, of each human resource, into a plurality of classes. The plurality of attributes is classified in such a manner that at least one attribute corresponding to at least one human resource and at least one other human resource is classified into a class and another class respectively. Further, based on the classification of each attribute associated with the human resource, a grade is assigned to the human resource.

11 Claims, 5 Drawing Sheets

(51) Int. Cl.
　　　*G06F 17/30*　　(2006.01)
　　　*G06Q 10/06*　　(2012.01)
(58) Field of Classification Search
　　　USPC .................................. 717/100–104, 120–122
　　　See application file for complete search history.

(56) References Cited

U.S. PATENT DOCUMENTS

| | | | | |
|---|---|---|---|---|
| 6,901,301 | B2* | 5/2005 | Bradshaw | G06Q 10/06398 700/1 |
| 7,406,434 | B1* | 7/2008 | Chang | G06Q 10/06375 705/14.1 |
| 8,275,651 | B2* | 9/2012 | Nagaya | G06Q 10/06 705/7.42 |
| 8,336,028 | B2* | 12/2012 | Hinton | G06F 8/74 705/7.36 |
| 8,571,803 | B2* | 10/2013 | Hill | G06F 19/12 702/19 |
| 8,726,236 | B2* | 5/2014 | Coldicott | G06F 8/36 707/661 |
| 9,032,360 | B1* | 5/2015 | Cohen | G06F 11/3684 717/103 |
| 9,251,472 | B1* | 2/2016 | Linowes | G05D 23/1923 |
| 9,292,262 | B2* | 3/2016 | Gabel | G06Q 30/02 |
| 9,378,015 | B2* | 6/2016 | Nagappan | G06F 11/3616 |
| 9,904,579 | B2* | 2/2018 | Shear | G06F 9/50 |
| 9,961,202 | B2* | 5/2018 | Bellosi | H04M 3/5175 |
| 2013/0262453 | A1 | 10/2013 | Lin et al. | |

OTHER PUBLICATIONS

Johansson et al, "Sparse Bayesian Classification of Predicate Arguments" ACM, pp. 177-180, 2005.*

Eick et al, "Learning Bayesian Classification Rules through Genetic Algoritms", ACM, pp. 305-313, 1993.*

Pronk et al, "Incorporating User Control into Recommender Systems Based on Naive Bayesian Classi cation", ACM, pp. 73-80, 2007.*

Fan et al, "A Bayesian Approach to Use Emerging Patterns for Classification", ACM, pp. 1-10, 2003.*

Arlotto et al, "Optimal Employee Retention When Inferring Unknown Learning Curves", IEEE, pp. 1178-1188, 2010.*

Yuen et al, "A Distributed Fuzzy Qualitative Evaluation System", IEEE, pp. 1-4, 2006.*

Hale, M.; Jorgenson, Noah and Gamble, R., "Predicting individual performance in student project teams", May 22-24, 2011, 10.

* cited by examiner

SYSTEM AND METHOD FOR EVALUATING HUMAN RESOURCES IN A SOFTWARE DEVELOPMENT ENVIRONMENT

CROSS-REFERENCE TO RELATED APPLICATIONS AND PRIORITY

The present application claims the benefit of Indian Complete Patent Application No. 2745/DEL/2015, filed on Sep. 1, 2015, the entirety of which is hereby incorporated by reference.

BACKGROUND OF THE INVENTION

(1) Field of the Invention

The present subject matter described herein, in general, relates to a system and method for evaluating human resources in a software development environment.

(2) Description of the Related Art

Grading or skill rating of human resources is a sensitive task. It involves lot of considerations not only from human resources perspective, but also from a perspective of a project or task. Specially, when the grading has to be done in a software industry for software developers or software testers, it becomes quite complex process. The software developers or the software testers have their own level of expertise and experience. Also, their expertise and experience are linked with one or more domains of the software industry. Not only that, there are some other factors too, which plays important role in evaluating the software developers or the software testers.

Considering all these things together on a common platform is a complex and a tedious activity. There is always a possibility of missing an important factor during the evaluation process. Apart from this, there is another issue of consideration of a scale on which the human resources are evaluated. Putting two human resources (for example, Senior Programmer and Junior Programmer), working on a same project, on the same scale for the purpose of evaluation is not necessarily correct every time. For example, if a number of defects reported, in a developed software code, are 15 for the Senior Programmer and 20 for the Junior Programmer, then it will be injustice to say that the Senior Programmer has performed better than the Junior Programmer. This is because, the level of Senior and Junior Programmer is not same, and hence, the expectation is different from both of them. Thus, considering all the factors and making sure that human resources are evaluated on different scales based on their experience and expertise is still missing in known arts.

SUMMARY

This summary is provided to introduce aspects related to a system and method for evaluating a human resource in a software development environment are further described below in the detailed description. This summary is not intended to identify essential features of subject matter nor is it intended for use in determining or limiting the scope of the subject matter.

In one implementation, a system for evaluating a human resource in a software development environment is disclosed. The system may comprise a processor and a memory coupled to the processor. The processor may execute a plurality of modules stored in the memory. The plurality of modules may comprise a receiving module, an extracting module, a classifying module, an assigning module and an allocating module. The receiving module may receive historical performance data and profile data associated with a plurality of human resources involved in a software project. The extracting module may extract a plurality of attributes, from the historical performance data and the profile data, corresponding to each human resource. The classifying module may classify the plurality of attributes, of each human resource, into a plurality of classes, by implementing a Bayesian classification technique on the plurality of attributes. In one aspect, the plurality of attributes is classified such that at least one attribute corresponding to at least one human resource and at least one other human resource is classified into a class and another class respectively. Upon classification, the assigning module may assign a grade to a human resource based on the classification of each attribute associated with the human resource, thereby evaluating the human resource in the software development environment.

In another implementation, a method for evaluating a human resource in a software development environment is disclosed. In order to evaluate a human resource in a software development environment, initially, historical performance data and profile data associated with a plurality of human resources, involved in a software project, may be received. Upon receiving the historical performance data and profile data, a plurality of attributes, corresponding to each human resource, may be extracted from the historical performance data and the profile data. Further, the plurality of attributes, of each human resource, may be classified into a plurality of classes, by implementing a Bayesian classification technique on the plurality of attributes. In one aspect, the plurality of attributes is classified such that at least one attribute corresponding to at least one human resource and at least one other human resource is classified into a class and another class respectively. Furthermore, a grade may be assigned to a human resource based on the classification of each attribute associated with the human resource, thereby evaluating the human resource in the software development environment. In an implementation, the aforementioned method for evaluating a human resource in a software development environment may be performed by a processor using programmed instructions stored in a memory.

In yet another implementation, a non-transitory computer readable medium embodying a program executable in a computing device for evaluating a human resource in a software development environment is disclosed. The program may comprise a program code for receiving historical performance data and profile data associated with a plurality of human resources involved in a software project. The program may further comprise a program code for extracting a plurality of attributes, from the historical performance data and the profile data, corresponding to each human resource. Further, the program may comprise a program code for classifying the plurality of attributes, of each human resource, into a plurality of classes, by implementing a Bayesian classification technique on the plurality of attributes. Further, the plurality of attributes is classified such that at least one attribute corresponding to at least one human resource and at least one other human resource is classified into a class and another class respectively. The program may further comprise a program code for assigning a grade to a human resource based on the classification of each attribute associated with the human resource, thereby evaluating the human resource in the software development environment.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
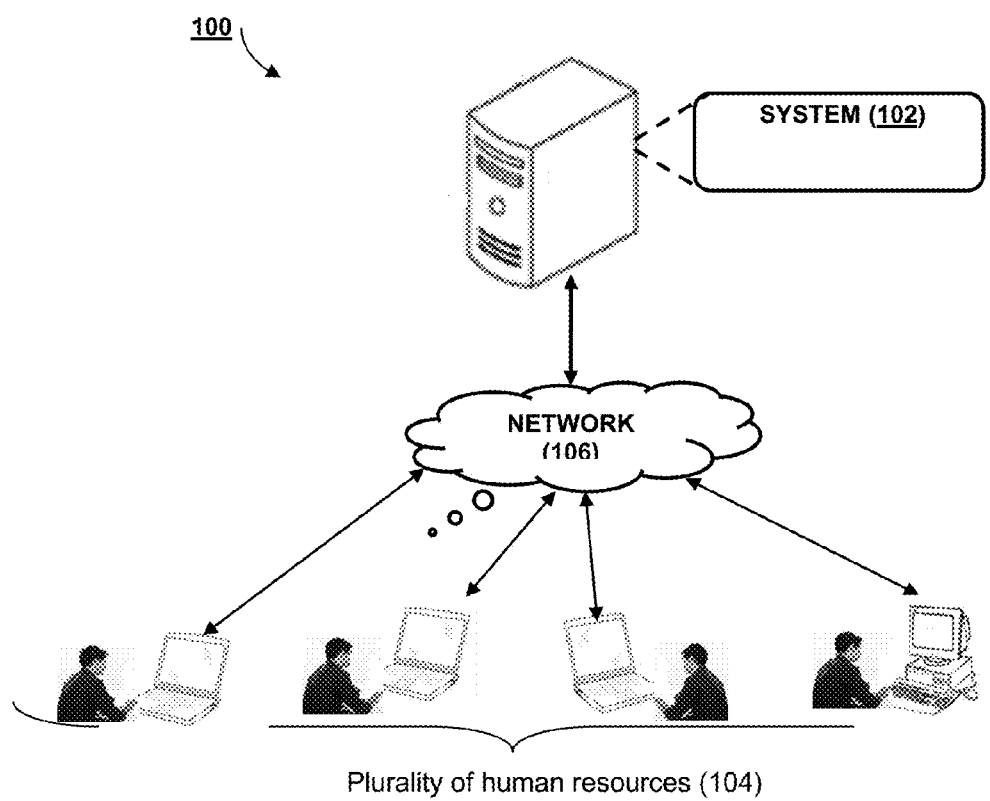
FIG. 1 illustrates a network implementation of a system for evaluating a human resource in a software development environment, in accordance with an embodiment of the present disclosure.

Referring to FIG. 1, a network implementation 100 of a system 102 for evaluating a human resource in a software development environment is illustrated, in accordance with an embodiment of the present subject matter. Although the present subject matter is explained considering that the system 102 is implemented as a software application on a server, it may be understood that the system 102 may also be implemented as a variety of computing systems, such as a laptop computer, a desktop computer, a notebook, a workstation, a mainframe computer, a server, a network server, a tablet, a mobile phone, a robot and the like. In one implementation, the system 102 may be implemented in a cloud-based environment. According to embodiments of present disclosure, plurality of human resources 104 working on plurality of machines may be connected with the system 102 through a network 106. Examples of the plurality of machines may include, but are not limited to, a production server, an application server, a web server, a database server, a computer, a computing device, and a laptop, a portable computer, a personal digital assistant, a handheld device, and a workstation. Further, plurality of human resources may be a software developer or a software tester or any other human resource involved in a software project.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
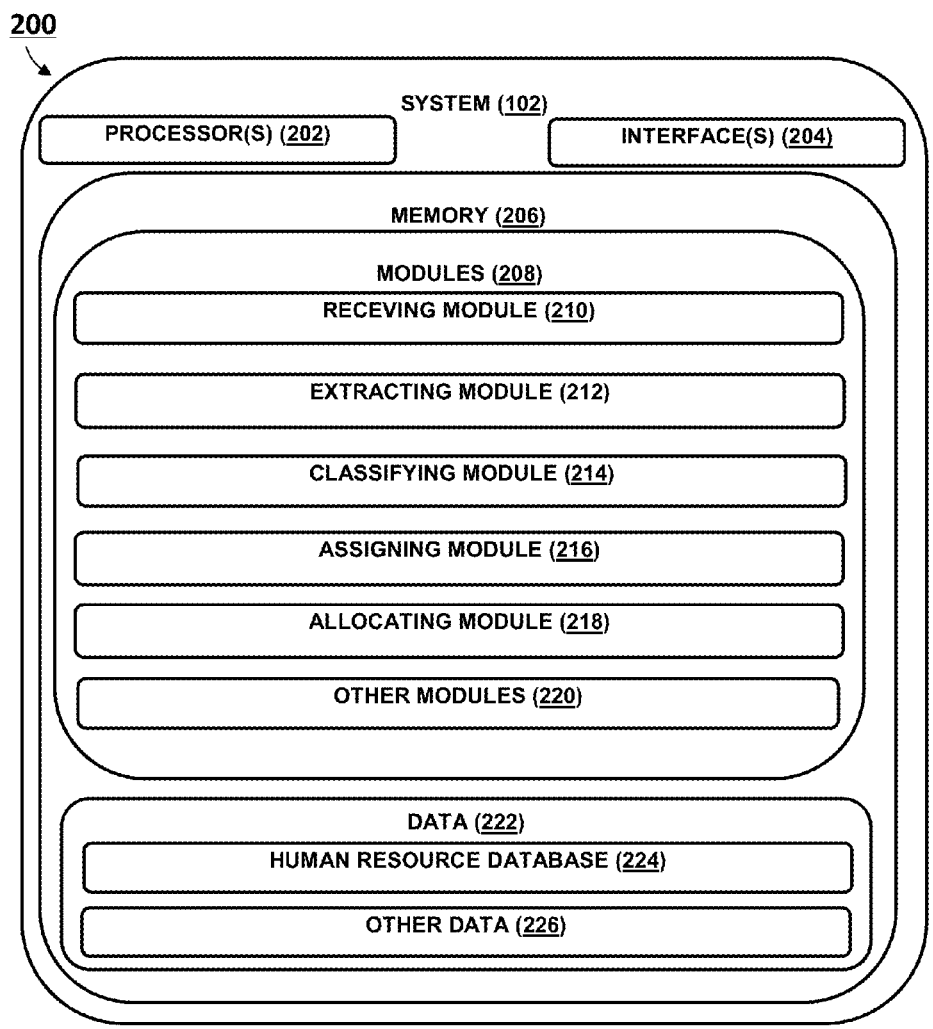
FIG. 2 illustrates the system, in accordance with an embodiment of the present subject matter.

Referring now to FIG. 2, the system 102 is illustrated in accordance with an embodiment of present disclosure. In one embodiment, the system 102 may include at least one processor 202, an input/output (I/O) interface 204, and a memory 206 and data 222. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions or modules stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, a compact disks (CDs), digital versatile disc or digital video disc (DVDs) and magnetic tapes. The memory 206 may include modules 208 which may perform particular tasks or implement particular abstract data types.

The modules 208 include routines, programs, objects, components, data structures, etc., which perform particular tasks or implement particular abstract data types. In one implementation, the modules 208 may include a receiving module 210, an extracting module 212, classifying module 214, an assigning module 216, an allocating module 218, and other modules 220. The other modules 220 may include programs or coded instructions that supplement applications and functions of the system 102.

The data 222, amongst other things, serves as a repository for storing data processed, received, and generated by one or more of the modules 208. The data 222 may also include a human resource database 224, and other data 226.

Now referring to FIGS. 2 and 3A, 3B, 3C, 3D, system 102 is provided for evaluating plurality of human resources in a software development environment is explained in detail. Basically, the plurality of human resources is software developers, software testers, or any other person involved in a software project associated with software solution or a software product. The plurality of human resources has certain level of expertise and experience. Based on their expertise and the experience, they are deployed in the software project. Few of them are managers, senior developers, developers, junior developers, and so on. Each one of them has defined responsibilities and role based on which their performances are measured. Since, the responsibilities and the roles of the plurality of human resources are different, it is important to set or define parameters for evaluating the plurality of human resources. This is because, the senior developers and junior developers cannot be evaluated on same parameters. Thus to address this issue, the present disclosure provides the system and method for evaluating the plurality of human resources based on their skills, contributions, rating, experience, levels and many other computable and extractable parameters.

At first, a receiving module 210, of the system 102, may receive historical performance data and profile data associated with the plurality of human resources involved in the software project. The historical performance data and the profile data may be received from plurality of repositories like user profile system, Subversion (SVN) repository, defect repositories, and project tracking system. As can be seen from FIG. 3A, the historical performance data and profile data received from the multiple repositories in a form of raw data. From that raw data (i.e., the historical performance data and profile data), the extracting module 212, of the system 102, extracts a plurality of attributes corresponding to each human resource. The plurality of attributes extracted indicates personal, professional, and historical details of the human resource. For example, the plurality of attributes may comprise, but not limited to, total years of experience, years of experience relevant for the software project, code completion duration, number of defects fixed, number defects reported corresponding to the developed code, complexity, functional complexity, thousands of lines of code (KLOC), location of the human resource, self-assessment rating given by the human resource, a supervisor-rating given by a project-supervisor of the software project, and the like. Further, the plurality of attributes extracted may be stored in the human resource database 224 of the system 102. Further, since the human resources are in different categories like senior developers, junior developers, managers and the like, the system 102 may consider few specific attributes corresponding to each category of the human resource. These specific attributes may be same as of discussed above or may be different attributes. According to embodiments of present disclosure, few examples of these specific attributes corresponding to the categories of the human resources have been explained in subsequent paragraphs of the specification.

In one example, for grading Software developer (i.e., a human resource) in software development life cycles (SDLC), the specific attributes may also be used, apart from the plurality of attributes discussed above. These specific attributes may comprise, but not limited to, location of the Software developer, impact of the Software developer's co-location, Software developer's overall experience, Software developer relevant domain experience, Software developer's product experience, prior rating (s) associated with the Software developer, complexity estimates (such as function point of the features), change of function point from previous release to current release, number of files changed, average file complexity, function complexity, class complexity, number of lines of code changed, defect related metrics (such as count of defects fixed by a developer per release), defect categories (design, coding, testing etc), ownership of the defect, defect injection information, defect type (internal or customer reported), age of the defect, type of work (i.e., change request, new features added), time taken per fix/check-in and Industry/company base line effort as reference, productivity metric and the like.

Similarly, for grading Support executive (SE) (i.e., a human resource) in software development Life cycle, specific attributes may also be used, apart from the plurality of attributes discussed above. These specific attributes may comprise, but not limited to, Support Executive overall experience, Support Executive relevant domain experience, total calls handled by the Support executive, average call handling time, turnaround time, Mean response time (MRT), Mean time to response (MTTR), First call resolution (FCR), Customer Satisfaction Score (CSAT score), Escalation handle and escalation issue, defect raised, quality score, login hours (available, idle, talk), Knowledge Documents published in response to various issues/bugs, forum publications, re-open rate, productivity and the like.

Similarly, for grading Software tester (i.e., a human resource) in software development life cycles (SDLC), specific attributes may also be used, apart from the plurality of attributes discussed above. These specific attributes may comprise, but not limited to, location of the Software tester, impact of the Software tester's co-location, Software tester's overall experience, Software tester's relevant domain experience, Software tester's product experience, Software tester's rating, test case review activity including the complexity of test case, time taken for developing of the test cases, percentage of requirements covered by developed test case and quality of test cases. These specific attributes further includes the following attributes. Test bed creation review activity including the complexity of test bed, total time taken for test bed creation, type of test bed (new or update) and quality of test bed. Trouble shooting (TS) review activity which includes the complexity of TS), total time taken for trouble shooting, test bed and feature quality of TS. Test script development (TSD) review activity which includes the complexity of Test scripts, type of test scripts (new creation or modification of existing) and the quality of test scripts. Defect filing (DF) review activity which includes the test bed, test executed map, severity and feature mapped test case, defect re-open and the quality of DF. According to embodiments of present disclosure, few other matrices are included for review the activity of tester like, test process matrices, test product matrices, test efficiency matrices, test effort matrices and test product matrices. Test suite sufficiency, coverage and test data sufficiency are additional parameters extracted and used towards tester (i.e., the human resource) grading.

Figure 3A:
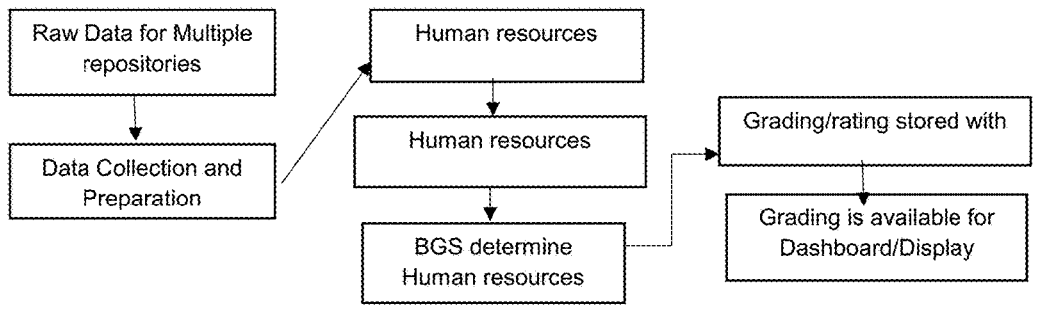
FIG. 3A, 3B, 3C, 3D illustrates detail explanation of the system, in accordance with an embodiment of the present disclosure.
Figure 3B:
Figure 3B:
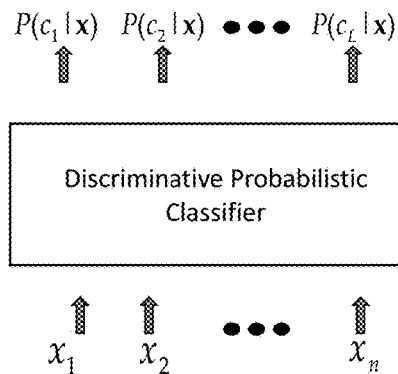
Figure 3C:
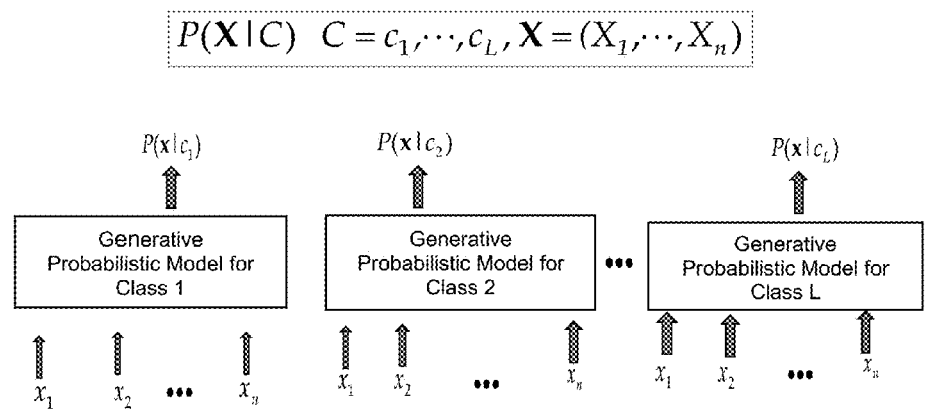
Figure 3D:
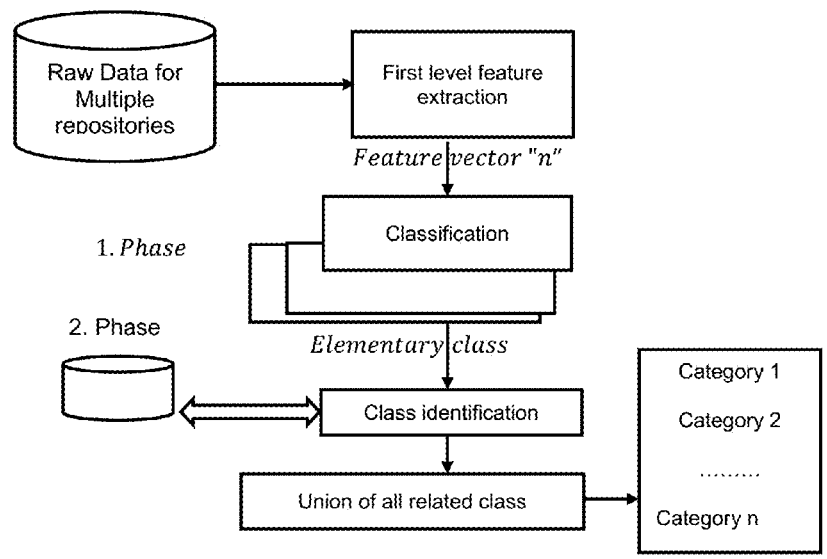

Once the plurality of attributes for the plurality of human resources is extracted, it is required to classify these attributes in classes. For this, the classifying module 214, of the system 102, may implement a Bayesian classification technique on the plurality of attributes. The implementation of the Bayesian classification technique is shown in the FIGS. 3B and 3C. The FIG. 3B shows the discriminative probabilistic classifier. Whereas, the FIG. 3C shows generative probabilistic models for class 1, class 2 and class L. Further, based on such implementation, the plurality of attributes, for each human resource, is classified into a plurality of classes. Further, the plurality of attributes are classified in such a manner that at least one attribute corresponding to at least one human resource and at least one other human resource is classified into a class and another class respectively. This means that an attribute, for example, total years of experience may be classified in a class "High" for the senior developer, whereas, the same attribute (total years of experience) may be classified in a class "Low" for the junior developer. In one example, the classes may be high, medium, and low. Further, the implementation of the Bayesian classification method is explained in subsequent paragraphs of the specification.

Consider a tuple X denoted by vector $(X_1, X_2, \ldots, X_d)$ and class of Ci, given the probability p(Ci) and p(X|Ci) which denotes the prior probability that the random sample is a member of class Ci and p(X|Ci) is the conditional probability of obtaining attribute values X given the sample is from Ci. In this example, the Bayesian classification method may be applied for estimating a probability of a sample tuple belongs to the class Ci.

$$p(X_1, X_2, \ldots, X_d) = \Sigma_{n=1}^{k} p(C_j) p(X_1, X_2, \ldots, X_d | C_j). \quad \text{Equation 1}$$

The above equation 1 indicates the conditional probability that a tuple with attributes values $X_1, X_2, \ldots, X_d$ belongs to class Cj.

$$p(C_j \mid X_1, X_2, \ldots, X_d) = \frac{p(C_j)p(X_1 \mid C_j)p(X_2 \mid C_j) \ldots p(X_d \mid C_j)}{\sum_{n=1}^{k} p(C_j)p(X_1 \mid C_j)p(X_2 \mid C_j) \ldots p(X_d \mid C_j)}. \quad \text{Equation 2}$$

From the k classes ($C_1, C_2, \ldots, C_k$) and d tuples (each tuples has a d dimension set of vectors), naive Bayes classifier derives and predict attribute values X belong to class $C_i$ if, $p(C_i|X) > p(C_j|X)$ for $1 \leq j \leq k$, $1 \leq i \leq k$.

Further, the maximum posterior hypothesis is defined as:

$$(C_i \mid X) = \frac{p(C_i)p(X \mid C_i)}{p(X)}.$$

According to the embodiments of present disclosure, the Bayesian classifier may aim to maximize p(Ci)*p(X|Ci) as p(X) is a constant. Further, the naive assumptions of class independence are defined as: $p(X|C_i) = \Pi_{k=1}^{d} p(X_k|C_i)$.

This way the plurality of attributes is classified in their respective classes for each human resource. According to an embodiment of the present disclosure, a two phase automatic multilevel annotation process is shown in the FIG. 3D. Once the classification of each attribute is done, the assigning module 216, of the system 102, assigns a grade to the human resource based on the classification of each attribute associated with the human resource. Based on the grade assigned, performance of the human resource is evaluated corresponding to the software project. Few examples of the grade assigned are excellent, above average, average, and below average. It may be noted to a person skilled in art, that there may be several other grades also which may be assigned to the human resource. Assigning the grade also helps the system 102 in allocating a particular task to the plurality of human resources. According to the embodiments of the present disclosure, the allocating module 218, of the system 102, allocates a task, associated with the software project, to the human resource, of the plurality of human resources, based on the grade assigned to the human resource.

After the grade is assigned, the system 102 may utilize the information, for example, classes into which the attributes are classified for the human resource, in subsequent releases associated with the software project. So, in the next time, this information is utilized for grading the human resources corresponding to next release of the software. The present disclosure improves overall project efficiencies which would result in effort and time saving for the project or the set of tasks. Since, the system 102 automates the human resource allocation process which was previously getting delayed due to non-availability of the human resources. Thus, the present disclosure makes the task allocation process more objective and also reduces favoritism or biases towards a particular human resource.

Figure 4:
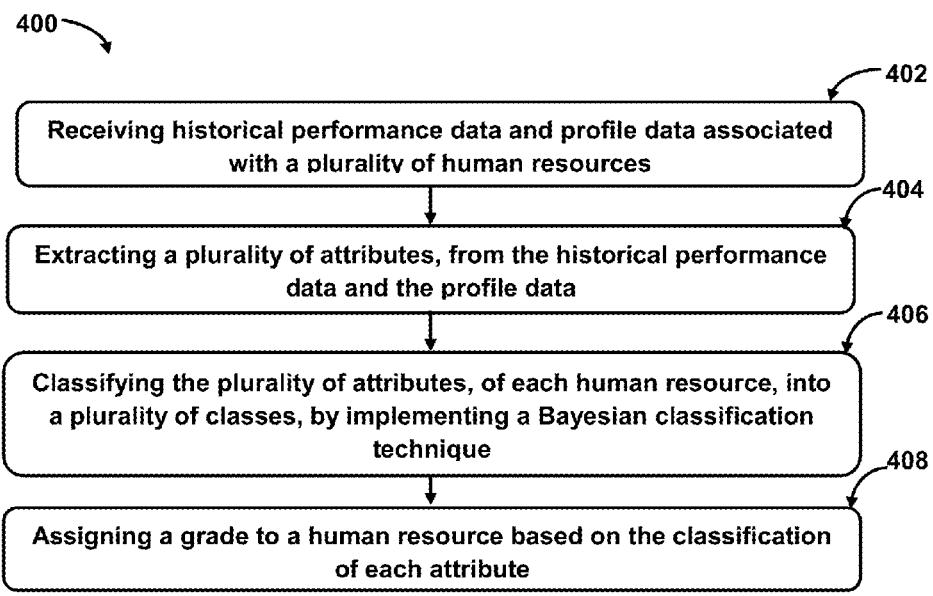
FIG. 4 illustrates a method for evaluating a human resource in a software development environment, in accordance with an embodiment of the present disclosure.

Referring now to FIG. 4, the method of evaluating a human resource in a software development environment is shown, in accordance with an embodiment of the present subject matter. The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented in the above described system 102.

At block 402, a historical performance data and profile data associated with a plurality of human resources involved in a software project is received.

At block 404, a plurality of attributes is extracted, from the historical performance data and the profile data, corresponding to each human resource. Further, the plurality of attributes extracted may comprise total years of experience, years of experience relevant for the software project, code completion duration, number of defects fixed, number defects reported corresponding to the developed code, complexity, functional complexity, thousands of lines of code (KLOC), location of the human resource, self-assessment rating given by the human resource, and a supervisor-rating given by a project-supervisor of the software project.

At block 406, the plurality of attributes, of each human resource, is classified into a plurality of classes, by implementing a Bayesian classification technique on the plurality of attributes. Further, the plurality of attributes are classified such that at least one attribute corresponding to at least one human resource and at least one other human resource is classified into a class and another class respectively.

At block 408, a grade to a human resource is assigned based on the classification of each attribute associated with the human resource. Thus, the evaluation of the human resource is done based on the grade assigned.

Although implementations for system and method for evaluating a human resource in a software development environment have been described in language specific to structural features and/or methods, it is to be understood that the appended claims are not necessarily limited to the specific features or methods described. Rather, the specific features and methods are disclosed as examples of implementations for evaluating a human resource in a software development environment using the Bayesian classification technique.

We claim:

1. A method for automatically evaluating a human resource in a software development environment, wherein the method comprising:
    receiving, by a processor, historical performance data and profile data, associated with a plurality of human resources involved in a software project, as raw data, wherein the raw data is received from a plurality of repositories comprising user profile system Subversion (SVN) repository, defect repositories, and project tracking system;
    retrieving, by the processor, a plurality of attributes, from the historical performance data and the profile data, corresponding to each human resource;
    classifying, by the processor, the plurality of attributes, of each human resource, into a plurality of classes by implementing a Bayesian classification technique on the plurality of attributes,
    wherein the Bayesian classification technique comprises a discriminative probabilistic classifier model and a generative probabilistic model, and
    wherein the plurality of attributes are classified, by using at least one of the discriminative probabilistic classifier model and the generative probabilistic model, such that at least one attribute corresponding to at least one human resource and at least one other human resource is classified into a class and another class respectively; and assigning, by the processor, a grade to a human resource based on the classification of each attribute associated with the human resource, thereby automatically evaluating the human resource in the software development environment.

2. The method of claim 1, wherein the plurality of attributes comprises total years of experience, years of experience relevant for the software project, code completion duration, number of defects fixed, number defects reported corresponding to the developed code, complexity, functional complexity, thousands of lines of code (KLOC), location of the human resource, self-assessment rating given by the human resource, and a supervisor-rating given by a project-supervisor of the software project.

3. The method of claim 1, further comprising allocating a task, associated with the software project, to a human resource, of the plurality of human resources, based on the grade assigned to the human resource.

4. The method of claim 1, wherein the grade assigned is at least one of an excellent, above average, average, and below average.

5. The method of claim 1 further comprises
collecting, by the processor, the raw data from the plurality of repositories; and
preparing, by the processor, the raw data for extraction of the plurality of the attributes.

6. A system for evaluating a human resource in a software development environment, the system comprises:
a processor;
a memory coupled to the processor, wherein the processor executes a set of instructions stored in the memory to:
receive historical performance data and profile data, associated with a plurality of human resources involved in a software project, as raw data,
wherein the raw data is received from a plurality of repositories comprising user profile system Subversion (SVN) repository, defect repositories, and project tracking system;
retrieve a plurality of attributes, from the historical performance data and the profile data, corresponding to each human resource;
classify the plurality of attributes, of each human resource, into a plurality of classes by implementing a Bayesian classification technique on the plurality of attributes,
wherein the Bayesian classification technique comprises a discriminative probabilistic classifier model and a generative probabilistic model, and wherein the plurality of attributes are classified, by using at least one of the discriminative probabilistic classifier model and the generative probabilistic model, such that at least one attribute corresponding to at least one human resource and at least one other human resource is classified into a class and another class respectively; and assign a grade to a human resource based on the classification of each attribute associated with the human resource, thereby automatically evaluating the human resource in the software development environment.

7. The system of claim 6, wherein the plurality of attributes comprises total years of experience, years of experience relevant for the software project, code completion duration, number of defects fixed, number defects reported corresponding to the developed code, complexity, functional complexity, thousands of lines of code (KLOC), location of the human resource, self-assessment rating given by the human resource, and a supervisor-rating given by a project-supervisor of the software project.

8. The system of claim 6, further comprise to allocate a task, associated with the software project, to a human resource, of the plurality of human resources, based on the grade assigned to the human resource.

9. The system of claim 6, wherein the grade assigned is at least one of an excellent, above average, average, and below average.

10. The system of claim 6 is further configured to
collect the raw data from the plurality of repositories; and
prepare the raw data for extraction of the plurality of the attributes.

11. A non-transitory computer readable medium embodying a program executable in a computing device for evaluating a human resource in a software development environment, the program comprising:
a program code for receiving historical performance data and profile data, associated with a plurality of human resources involved in a software project, as raw data, wherein the raw data is received from a plurality of repositories comprising user profile system Subversion (SVN) repository, defect repositories, and project tracking system;
a program code for retrieving a plurality of attributes, from the historical performance data and the profile data, corresponding to each human resource;
a program code for classifying the plurality of attributes, of each human resource, into a plurality of classes by implementing a Bayesian classification technique on the plurality of attributes,
wherein the Bayesian classification technique comprises a discriminative probabilistic classifier model and a generative probabilistic model, and
wherein the plurality of attributes are classified, by using at least one of the discriminative probabilistic classifier model and the generative probabilistic model, such that at least one attribute corresponding to at least one human resource and at least one other human resource is classified into a class and another class respectively; and
a program code for assigning a grade to a human resource based on the classification of each attribute associated with the human resource, thereby automatically evaluating the human resource in the software development environment.

* * * * *